May 17, 1960     J. J. VIENNEAU ET AL     2,937,352
MAGNETIC CORE STRUCTURE
Filed April 23, 1953
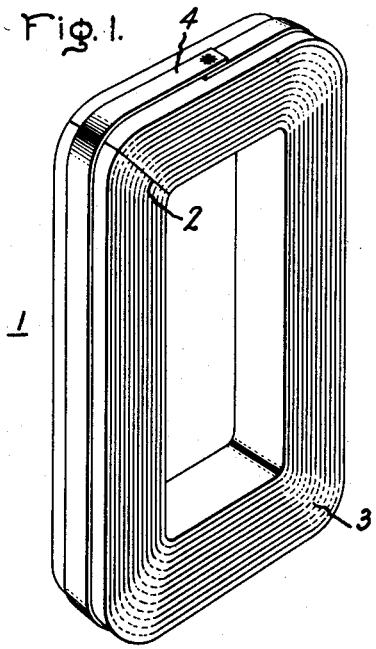
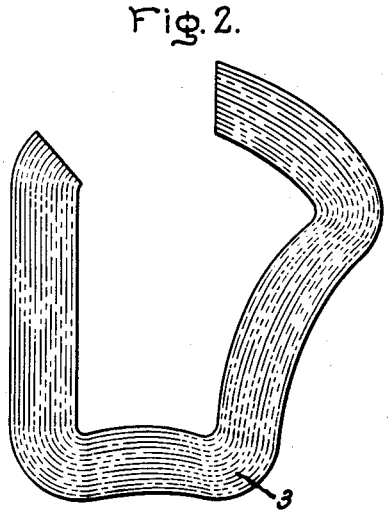
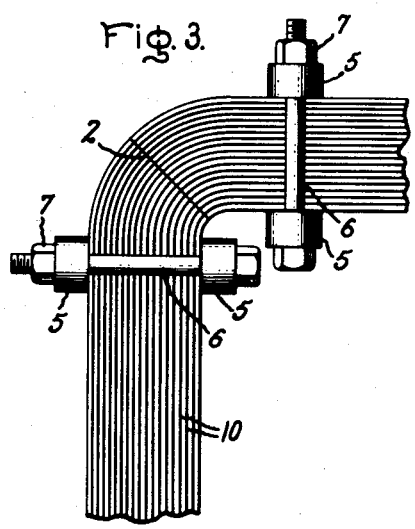
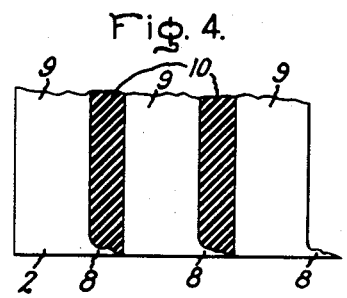
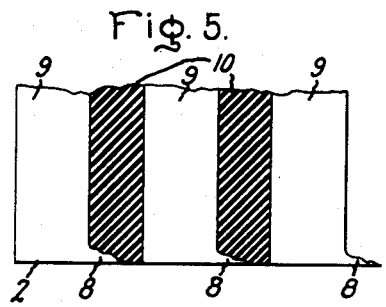
Inventors:
Jacob J. Vienneau,
Kenneth D. Beardsley,
by *Gilbert P. Tarleton*
Their Attorney.

United States Patent Office 2,937,352
Patented May 17, 1960

2,937,352

MAGNETIC CORE STRUCTURE

Jacob J. Vienneau and Kenneth D. Beardsley, Pittsfield, Mass., assignors to General Electric Company, a corporation of New York Application April 23, 1953, Serial No. 350,722

3 Claims. (Cl. 336—216)

This invention relates to a magnetic core structure, and more particularly, to an improved butt joint strip wound laminated magnetic core structure, and to a method of making same.

A known form of butt joint laminated magnetic core structure comprises a continuous and relatively narrow strip of flat thin metallic magnetic material wound continuously into a rectangular or annular core section with a window opening therein. Each of the layers or turns of the magnetic strip material are superimposed and concentric with respect to each other.

When used in a transformer apparatus, electrical winding coils are linked with said strip wound laminated core section. To do this, a butt joint is formed in the closed core section by cutting through all the laminations. Then the core section can be pried or hinged open and a prewound electrical winding coil assembly can be linked therewith.

Prior to formation of the butt joint by cutting, some form of holding means has to be employed to hold the various laminations together so they will not become disassembled when the core is hinged open. Also, the various laminations must be held together so they will not become misaligned from their original uncut positions so that the butt joint can be accurately closed.

In the known prior art the holding means employed are rigid means like welding, mechanical clamps, or hard-setting enamels, varnishes, or cements. For instance, prior to cutting, the laminated core section may be impregnated with a hard setting varnish. After the varnish sets it rigidly bonds adjacent laminations of the core section together.

A disadvantage of hard setting or rigid holding means is that relatively little play or freedom of movement is permitted between adjacent laminations when the core section is hinged or pried open. As a consequence, when the core section is hinged open mechanical stresses are formed in the various laminations which cause electrical losses in the magnetic core.

Another problem encountered in the prior art is that during the cutting operation the cut laminations have burrs formed thereon. The burrs of each cut lamination make electrical contact with adjacent laminations. That is, a short circuit is formed in the core at the cut portions. This short circuit condition also causes electrical losses in the magnetic core.

It is an object of this invention to provide a butt joint strip wound laminated core section having a minimum of electrical losses.

It is a further object of this invention to provide a butt joint strip wound laminated core section impregnated with an elastic electrical insulating bonding material to hold adjacent laminations together and prevent a short circuit at the faces of the butt joint.

It is a further object of this invention to provide a method of constructing a butt joint strip wound laminated core section wherein adjacent laminations are elastically bonded together and a short circuit at the faces of the butt joint is prevented.

Our invention comprises a butt joint strip wound laminated magnetic core section having elastic means for holding adjacent laminations together and for preventing a short circuit at the faces of said butt joint.

Our invention also comprises a method of making a butt joint strip wound laminated magnetic core section comprising impregnating a strip wound laminated core section with an elastic electrical insulating bonding material, applying compressive forces to a portion of said core section, cutting said compressed portion to form a butt joint, and then removing said compressive forces. The method of our invention is claimed in our copending divisional application Serial No. 718,080 filed February 17, 1958, and assigned to the same assignee as the instant application.

The invention will be better understood from the following description taken in connection with the accompanying drawing and its scope will be pointed out in the appended claims.

In the drawing, Figure 1 is a perspective view of a butt joint hinged rectangular-like laminated core section formed by winding a relatively narrow flat thin strip of metallic magnetic material into a plurality of superimposed and concentric laminations. Figure 2 is an illustration of how a butt joint strip wound laminated core section is pried or hinged open to receive a prewound electrical winding coil assembly to be linked therewith. Figure 3 is an enlarged view of a butt joint portion of a laminated core section with clamps applied to said portion. Figure 4 is an enlarged view of the ends of the cut laminations of an elastic binder impregnated core section portion while compressive forces are applied to said portion. Figure 5 is an enlarged view of the ends of the cut laminations after the compressive forces have been removed.

Referring now to Figure 1 of the drawing, there is shown therein a rectangular-like strip wound laminated core section 1 having a cut or butt joint 2 so that the core section 1 can be hinged or pried open about a hinge portion 3, as illustrated in Figure 2, so that a prewound electrical winding coil assembly, not shown, can be linked with the core section 1. A strap or clamping means 4 aids in holding the core section 1 closed after the winding coil assembly, not shown, is linked with core section 1.

The rectangular-like core section 1 is formed by spirally winding a relatively narrow flat thin strip of metallic magnetic material into a plurality of superimposed and concentric laminations. Adjacent laminations are spaced a sufficient distance from each other to permit impregnation and closing of the core joint with a minimum of strain. As seen in Figure 1, the core section 1 has two vertical laminated leg portions joined by two horizontal laminated yoke portions. The cut 2 is preferably made in the upper left hand corner of core section 1 so that the core section 1 can be hinged open about a diagonally opposite corner 3. After the core section is wound it is annealed before impregnation and cutting to remove stresses set up in the laminations during the winding operation.

Prior to formation of the butt joint or cut 2 the core section 1 is impregnated with an elastic dielectric bonding material. The elastic bonding material holds adjacent laminations of core section 1 together so that they will not become disassembled during the opening or hinging operation.

By viewing Figures 1 and 2 it will be seen that the outer laminations of the cut core section 1 are longer than the inner laminations. During the hinging or opening operation the outer and longer laminations require a greater degree of movement or play than the shorter inner laminations. If rigid means are used to hold the various cut laminations together during the opening operation comparative free and unstressed movement of the longer laminations with respect to the shorter laminations is not permitted. That is, with rigid holding means the various laminations are buckled and distorted and have mechanical stresses formed therein. These mechanical stresses cause electrical losses in the magnetic core section.

However, with elastic holding means, limited free and easy movement of the various laminations with respect to each other is permitted during the hinging operation causing a minimum of mechanical stresses. Further, when the core section 1 is closed the elastic bonding material permits and aids the various laminations to assume their original uncut positions relative to each other so that the butt joint 2 can be accurately closed.

The faces of the butt joint can be painted with the elastic bonding material to aid in keeping the core section closed. A further advantage of having an elastic adhesive impregnant as the holding means is that audible noise is decreased. When a transformer is operating vibrations are set up in the magnetic core. Elastic substances are good sound dampers. Consequently, by impregnating the core and painting the faces of the butt joint with an elastic binder the amount of audible noise is decreased.

Most impregnating materials set up a strain in the surface of the core laminations due to shrinkage. An elastic adhesive minimizes this effect. Also, these strains can be further held to a minimum by impregnating only a part of the core, or by a purposely incomplete impregnation so that the adhesive between a pair of adjacent laminations is present only in streaks.

After impregnation of the core with an elastic adhesive and prior to cutting of the core to form a butt joint the portion of the core to be cut is subjected to compressive forces. Thus, as seen in Figure 3, the corner or portion to be cut is compressed, as by a pair of clamps comprising horizontal bars 5 joined at opposite ends by threaded bolts 6. Nuts 7 when threaded down on bolts 6 place the portion to be cut in compression. It should be noted that the compressive forces are applied substantially perpendicular or against the flat surfaces or planes of the laminations to be cut. These compressive forces compress the layers of elastic bonding material located between the various laminations of the core portion to be cut.

The purpose of compressing the elastic bonding material in the area to be cut is illustrated in Figure 4 and 5. As seen in Figure 4, when the cut 2 is made burrs 8 are formed at the ends of the cut laminations 9 which have compressed elastic bonding material 10 therebetween. The burrs 8 make electrical contact with adjacent laminations. Since all the laminations are then electrically interconnected a short circuit is formed in the laminated butt joint core at the faces of the butt joint. This short circuit condition results in electrical losses in the magnetic core.

However, by using an elastic dielectric bonding material and compressing the bonding material prior to cutting this short circuit condition is uniquely relieved. In Figure 5 is shown what occurs after the clamps of Figure 3 are removed after the cutting operation. The compressed elastic bonding material 10 expands to its substantially original noncompressed state. Expansion of the material 10 causes the cut core laminations 9 to be separated a sufficient distance to take the burrs 8 out of electrical contact with adjacent laminations 9. Thus, the short circuit condition of Figure 4 is removed.

It is to be noted that the whole core structure need not necessarily be impregnated with the elastic binder. For instance, only a portion of the core at the area to be cut need be impregnated if this partial impregnation of the core will be sufficient to hold the core laminations together when the core is hinged open. Such partial impregnation will still yield the benefits of the disclosed method of cutting and relieving short circuit conditions at the faces of the butt joint.

Further, while the invention is disclosed as applied to a rectangular-like core section it will be obvious that the invention can be applied to circular wound core sections and also core sections cut into a plurality of core subsections which are to be butt jointed together. Accordingly, by the term annular core section we do not intend to restrict ourselves to a circular wound core section having a window opening therein, but intend that the term comprise any closed core section having a window opening therein.

The elastic impregnant used does not constitute part of this invention but is a substance that can be readily purchased on the market. It should not be hard setting, but should be elastic to permit limited freedom of movement between the various laminations during the hinged opening operation, and should be adhesive enough to hold the various laminations from becoming disassembled. An elastic adhesive that has given good results is a synthetic thermosetting rubber-base adhesive of the butadiene acrylonitrile type. The elastic adhesive selected must not be corroded by transformer insulating oils.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What we claim as new and desire to secure by Letters Patent of the United States is:

1. In a magnetic core section portion comprising a plurality of thin flat metallic layers superposed with respect to each other in spaced relationship, each pair of adjacent metallic layers electrically isolated with respect to each other by elastic dielectric adhesive material disposed therebetween, said elastic adhesive material bonding adjacent pairs of metallic layers together elastically so that said plurality of metallic layers have limited free movement with respect to each other, said portion having a butt joint therein extending entirely therethrough comprising cut ends of said plurality of layers disposed on opposite sides of said butt joint, said cut ends having burrs thereon, said elastic adhesive material electrically isolating and separating the burrs on each side of said butt joint from the metallic layers adjacentmost thereto.

2. A laminated annular hinged butt joint magnetic core section comprising a plurality of thin flat annular strips of metallic magnetic material superimposed and substantially concentrically disposed with respect to each other, said annular strips defining a window opening, a plurality of elastic electrical insulating adhesive material laminations, a lamination of elastic adhesive material positioned between each pair of adjacent strips and elastically bonding said adjacent strips together, a portion of said core section having a butt joint therein extending entirely therethrough and defined by opposite cut ends of said annular strips and cut ends of said laminations, said cut strip ends having burrs thereon, the cut lamination ends of said elastic adhesive material being laminated with said cut strip ends and electrically insulating the burrs on each of said cut strip ends from the cut strip ends adjacentmost thereto, said elastic adhesive material laminations permitting limited free movement of said strips with respect to each other.

3. An annular butt jointed hinged curved core which has a single butt joint formed therein and comprises a plurality of superposed laminations of magnetic strip material which extend continuously around said core from said butt joint, the ends of said laminations having burrs formed thereon, means for electrically insulating the burrs on each of said lamination ends from the lamination ends which are adjacent thereto and for retaining said laminations with respect to each other while facilitating opening and closing of said butt joint by simultaneously hinging said laminations open and closed, said means comprising spaces between said laminations, said spaces at said lamination ends being greater than the length of said burrs, and said spaces having an elastic and dielectric material which is bonded to said laminations.

References Cited in the file of this patent

UNITED STATES PATENTS

| | | |
|---|---|---|
| 1,834,898 | Boyajian | Dec. 1, 1931 |
| 2,261,983 | Ford | Nov. 11, 1941 |
| 2,372,074 | Ford | Mar. 20, 1945 |
| 2,393,439 | White et al. | Jan. 22, 1946 |
| 2,411,374 | Horstman | Nov. 19, 1946 |
| 2,456,458 | Somerville | Dec. 14, 1948 |
| 2,489,625 | Dornbush | Nov. 29, 1949 |
| 2,478,029 | Vienneau | Aug. 2, 1949 |
| 2,554,262 | Nagel | May 22, 1951 |
| 2,586,320 | Ford | Feb. 19, 1952 |
| 2,655,717 | Dunn | Oct. 20, 1953 |

FOREIGN PATENTS

| | | |
|---|---|---|
| 464,243 | Canada | Apr. 11, 1950 |
| 624,233 | Great Britain | May 31, 1949 |